US007824025B2

(12) United States Patent
Ohira

(10) Patent No.: US 7,824,025 B2
(45) Date of Patent: Nov. 2, 2010

(54) INK CARTRIDGE AND INK-JET RECORDING APPARATUS

(75) Inventor: Hideo Ohira, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 846 days.

(21) Appl. No.: 11/697,033

(22) Filed: Apr. 5, 2007

(65) Prior Publication Data

US 2007/0236548 A1 Oct. 11, 2007

(30) Foreign Application Priority Data

Apr. 5, 2006 (JP) ............................ 2006-104453

(51) Int. Cl.
*B41J 2/175* (2006.01)
*G01D 11/00* (2006.01)

(52) U.S. Cl. ........................................ 347/86; 347/100

(58) Field of Classification Search ..................... 347/6, 347/7, 37, 84–87, 100
See application file for complete search history.

(56) References Cited

U.S. PATENT DOCUMENTS

| | | | | |
|---|---|---|---|---|
| 4,422,085 | A * | 12/1983 | Sumitomo et al. | 347/7 |
| 6,270,209 | B1 * | 8/2001 | Shimomura | 347/86 |
| 6,729,717 | B2 | 5/2004 | Ito et al. | |
| 7,063,405 | B2 | 6/2006 | Ito et al. | |
| 2003/0193555 | A1 * | 10/2003 | Koga et al. | 347/100 |

FOREIGN PATENT DOCUMENTS

JP 2002-067312 3/2002

* cited by examiner

*Primary Examiner*—An H Do
(74) *Attorney, Agent, or Firm*—Banner & Witcoff, Ltd.

(57) ABSTRACT

An ink cartridge for being mounted on an ink-jet recording apparatus includes an ink storage chamber for storing ink for ink-jet recording. A resin material forming the ink storage chamber contains a crystal-nucleating agent, and the ink has conductivity ranging from about 3 mS/cm to about 10 mS/cm.

11 Claims, 5 Drawing Sheets

INK CARTRIDGE AND INK-JET RECORDING APPARATUS

CROSS REFERENCE TO RELATED APPLICATION

This application claims the benefit of Japanese Patent Application No. 2006-104453, filed Apr. 5, 2006, which is incorporated herein by reference in its entirety.

BACKGROUND OF THE PRESENT INVENTION

1. Field of the Present Invention

The present invention relates to an ink cartridge that is mounted on an ink-jet recording apparatus, and to an ink-jet recording apparatus having mounted thereon an ink cartridge.

2. Description of the Related Art

In an ink-jet recording method, for the sake of high printed image quality and high printed character quality (hereinafter, collectively referred to as high print quality), accurate control of ejection of fine droplets having a volume of several picoliter from fine ejection nozzles is demanded. Accordingly, it is necessary to prevent a foreign substance from entering into and interfering with the flow of ink in a portion of an ink-jet recording apparatus that comes into contact with ink (hereinafter, the portion being also referred to as an ink flow passage).

In order to prevent the foreign substance from being clogged in the ink flow passage of the nozzles or an ink-jet recording head (hereinafter, simply referred to as head), countermeasures are taken, such as assembling of parts of the ink flow passage and the preparation of ink in a clean room, and the filtration of ink using a fine filter having a pore size of less than 1 μm. In addition, there is suggested a technology that, before ink for ink-jet recording is introduced into the head, prevents a foreign substance from flowing into the head by providing a filter in the ink flow passage (Japanese Patent Application Laid-open No. 2002-67312).

When such a filter is provided, if ink is stored in an ink storage chamber of an ink cartridge, precipitate occurs in ink, and thus the filter may be closed. In particular, when wide area printing that requires a large volume of ink is performed, the filter tends to be markedly closed.

The reason why the precipitate occurs while ink is stored in the ink cartridge is considered as follows. Generally, as a resin material for the ink cartridge, polyolefin resin that is cheap and can be easily processed is used, and a crystal-nucleating agent (sorbitol or the like) is mixed in the resin material for the sake of improving moldability or transparency. For this reason, when the resin material constituting the ink storage chamber of the ink cartridge continues to be in contact with ink for a long time, the crystal-nucleating agent may be eluted from the resin material and then become the precipitate.

As such, when the precipitate occurs in the ink storage chamber of the ink cartridge, the precipitate is accumulated on the filter, and an ink supply to a pressure chamber is unstable, such that ink is not ejected. Further, when ink that passes through the filter stays in the head for a long time, the precipitate may be grown. In this case, the ejection of ink droplets becomes unstable due to clogging of the ink flow passage or the nozzles. For this reason, if the precipitate resulting from the ink storage chamber of the ink cartridge occurs in ink, it is difficult to keep high print quality.

Accordingly, as the resin material constituting the ink storage chamber of the ink cartridge, there is no choice but to use a resin material that does not contain a crystal-nucleating agent as the cause of precipitate.

When the ink storage chamber of the ink cartridge is formed of a resin material not containing a crystal-nucleating agent, the precipitate resulting from the crystal-nucleating agent is prevented from occurring. In this case, however, moldability is degraded and many voids occur, or transparency is degraded. If the transparency of the ink storage chamber is degraded, in order to detect an ink residual quantity in the ink storage chamber, a transmissive ink detection sensor having a relatively complex structure has to inevitably be used, instead of a reflective ink detection sensor having a relatively simple configuration. In addition, in order to apply the transmissive ink detection sensor, the shape of the ink cartridge needs to be changed. Therefore, even if the crystal-nucleating agent is not used, it is necessary to select a resin material that can maintain moldability or transparency to some extent. As such, when the ink storage chamber of the ink cartridge is formed of the resin material not containing the crystal-nucleating agent, a degree of freedom of selecting the resin material for the ink storage chamber is degraded, and the structure of the ink cartridge or the ink-jet recording apparatus is complicated. Further, manufacturing costs of the ink-jet recording apparatus are increased.

SUMMARY OF THE INVENTION

The present inventors have found that, when the ink storage chamber of the ink cartridge is formed of a resin material containing a crystal-nucleating agent, the crystal-nucleating agent contained in the resin material of the ink storage chamber may be suppressed from being precipitated in ink by adjusting conductivity of ink for ink-jet recording to be stored in the ink storage chamber within a specified range, and have completed the present invention.

According to an aspect of the present invention, provided is an ink cartridge for being mounted on an ink-jet recording apparatus, the ink cartridge comprising:

an ink storage chamber for storing ink for ink-jet recording, wherein a resin material forming the ink storage chamber contains a crystal-nucleating agent, and the ink has conductivity ranging from about 3 mS/cm to about 10 mS/cm.

According to another aspect of the present invention, provided is an ink-jet recording apparatus comprising:

the ink cartridge above-mentioned; and an ink-jet recording head that has ejection nozzles for ejecting the ink stored in the ink cartridge.

DESCRIPTION OF PREFERRED EMBODIMENTS

Figure 1:
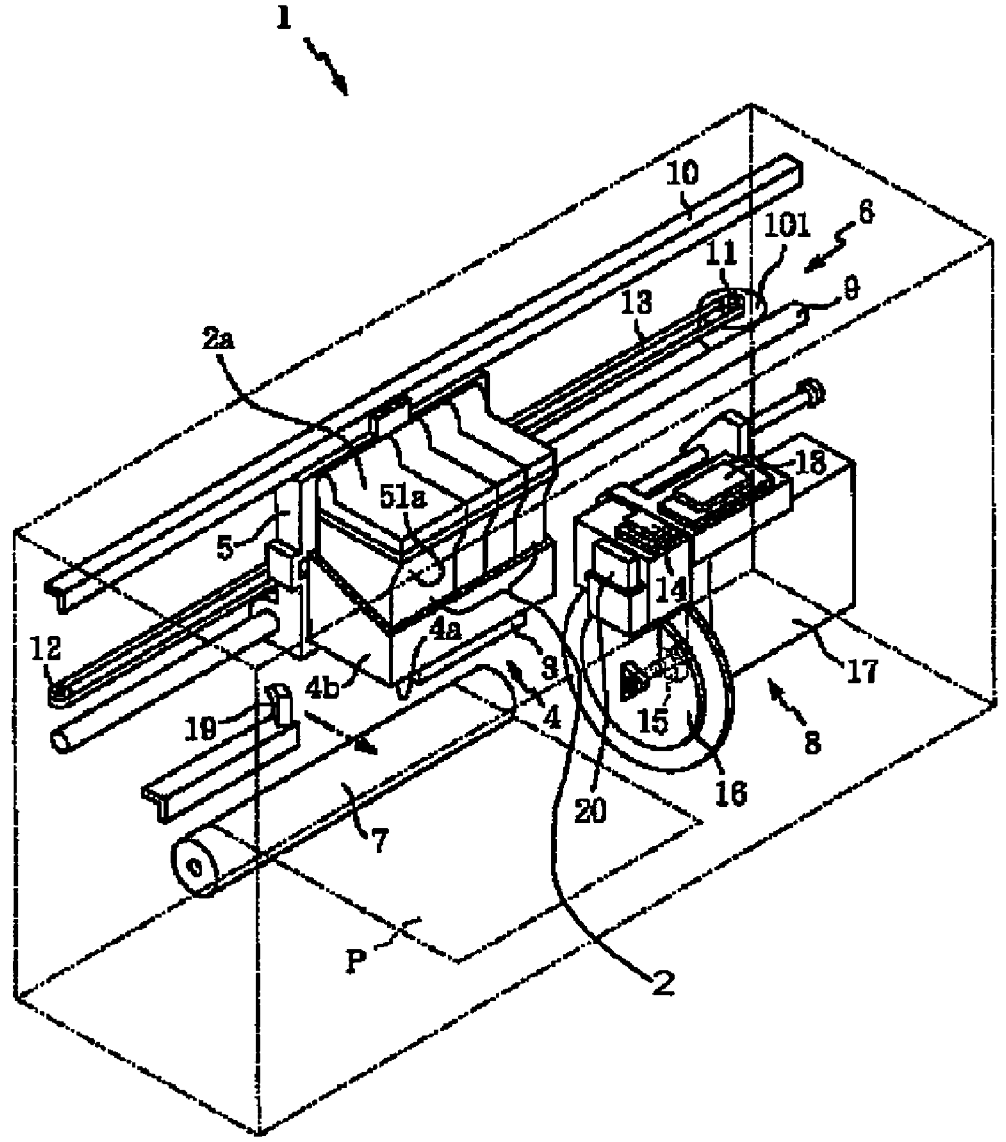
FIG. 1 is a perspective view of a color ink-jet printer on which an ink cartridge according to a first embodiment of the present invention is mounted.

An ink cartridge according to an embodiment of the present invention for being mounted on an ink-jet recording apparatus includes an ink storage chamber for storing ink for ink-jet recording. Here, a resin material forming the ink storage chamber contains a crystal-nucleating agent, and the ink has conductivity ranging from about 3 mS/cm to about 10 mS/cm.

As a preferred resin material forming the ink storage chamber of the ink cartridge, polyolefin resin may be exemplified. Examples of polyolefin resin, but are not particularly limited to, include polypropylene, high-density polyethylene, low-density polyethylene, linear low-density polyethylene, and the like. A mixture of at least two thereof may be used. A mixture of polyolefin resin with thermoplastic resin, polyester resin, polyurethane resin, or the like may be used insofar as it does not deteriorate the advantages of the present invention.

Examples of the crystal-nucleating agent that is blended in the resin material forming the ink storage chamber for the sake of improving moldability or transparency include, but are not limited to, sorbitol crystal-nucleating agents, such as dibenzylidene sorbitol, bis(p-methylbenzylidene)sorbitol, and bis(p-ethylbenzylidene)sorbitol; aluminum hydroxy-di (tert-butyl benzonate); phosphoric acid bis(4-tert-butylphenyl)sodium; and methylene bis(2,4-di-tert-butylphenyl) phosphate sodium salt. Among these, the sorbitol crystal-nucleating agent is preferably used since it is excellent in improving transparency.

The amount of the crystal-nucleating agent in the resin material forming the ink storage chamber is preferably in a range of about 0.01 to about 1.0% by weight, and more preferably, about 0.1 to about 0.3% by weight. If the amount of the crystal-nucleating agent is excessively small, an effect of improving moldability or transparency is not sufficient. Meanwhile, if the amount of the crystal-nucleating agent is excessively large, the crystal-nucleating agent is easily eluted.

The resin material forming the ink storage chamber does not contain mold release agents, which are generally used to improve mold releasability upon molding, for example, hydrocarbons such as paraffin wax, fatty acids such as stearic acid, aliphatic amides such as oleic amide, metal soaps such as calcium stearate, and esters such as butyl stearate. This is to exclude a possibility that the mode release agent oozes out in the ink and turns into the precipitate.

As described above, the ink for ink-jet recording that is stored in the ink storage chamber of the ink cartridge according to the embodiment of the present invention has conductivity ranging from about 3 mS/cm to about 10 mS/cm, and preferably about 4 mS/cm to about 7 mS/cm. If the conductivity is less than about 3 mS/cm, the precipitate resulting from the resin material forming the ink storage chamber cannot be sufficiently suppressed from occurring. Further, if the conductivity exceeds about 10 mS/cm, the dye or other solid contents tends to be precipitated, and a long-term preservation property of the ink itself deteriorates. As described above, if the conductivity of the ink is in a range of about 3 mS/cm to about 10 mS/cm, the crystal-nucleating agent may be used in various resin materials, for example polyolefin resin, and thus moldability, transparency, a flexural modulus, and a thermal distortion temperature may be improved. Therefore, a degree of freedom of selecting the resin material may be increased, and a reflective ink detection sensor may be used. As a result, the structure of the ink-jet recording apparatus may be simplified, and costs may be reduced.

As a method of setting the conductivity of the ink in the range of about 3 mS/cm to about 10 mS/cm, a method that increases the amount of an electrolyte in the ink is the most convenient. Various kinds of electrolytes are known and any electrolyte may be freely selected insofar as it does not affect the ink. Examples of a material for the electrolyte include coloring agents, sodium sulfate, potassium sulfate, ammonium sulfate, sodium nitrate, potassium nitrate, and ammonium nitrate. However, the material for the electrolyte is not limited to these materials.

When the coloring agent is used as the electrolyte, the number of components of the ink is suppressed to the minimum, thereby adjusting the conductivity. As the concentration of the coloring agent in the ink changes, the adjustment according to the concentration of the coloring agent may be performed by adjusting a voltage or a waveform to be applied to a piezoelectric element or a heater element for ejecting the ink so as to adjust the amount of the ink droplet.

When sodium sulfate is used as the electrolyte, it is ionized into sulfate ions as divalent negative ions and sodium ions as monovalent positive ions. Accordingly, a risk of precipitating a solute, such as the coloring agent, may be minimized without affecting the pH of the ink. In addition, the conductivity may be adjusted with the addition of a small amount of sodium sulfate. Besides, various advantages, such as a cheap material and the like, may be obtained.

Moreover, because a material that acidifies the pH of the ink or a material containing a large amount of chlorine result in metal corrosion, there is a possibility that the solute, such as the coloring agent, is precipitated. Accordingly, attention is demanded upon using the material. In addition, in respect to a material that extremely increases the pH, a lot of attention needs to be paid in view of safety of the ink (for example, dermal irritation).

In the embodiment of the present invention, on an assumption that the conductivity of the ink is adjusted within the range of about 3 mS/cm to about 10 mS/cm, the ink preferably contains water of about 50% by weight or more. Further, if necessary, the ink may contain a coloring agent, a humectant, a penetrant, a surface tension modifier, an anticorrosive agent, a pH modifier, or an antiseptic or fungicidal agent. In addition, the ink may contain a metal-sequestering agent, a viscosity modifier, a specific resistance modifier, a coating forming agent, an ultraviolet absorber, an antioxidizing agent, an antifading agent, a resin binder, a dye dissolving agent, and the like. Besides, when the ink-jet recording apparatus is a type that ejects ink according to the reaction of thermal energy, thermal physical values (for example, specific heat, a coefficient of thermal expansion, and thermal conductivity) may be adjusted.

The ink cartridge according to the embodiment of the present invention is preferably mounted on an ink-jet recording apparatus that includes an ink-jet recording head having ejection nozzles for ejecting the ink stored in the ink cartridge. As the ink-jet recording head, a known piezoelectric or thermal ink-jet recording head may be used. Further, a known reflective ink detection sensor is preferably mounted on the ink-jet recording apparatus to detect an ink residual quantity of the ink stored in the ink tank.

Next, an example of the mechanical structure of the ink cartridge according to the embodiment of the present invention and the ink-jet recording apparatus having the same will be described. This example corresponds to a color ink-jet printer that includes four ink cartridges 2 each having an ink storage chamber storing a respective color of ink, such as black, cyan, magenta and yellow inks, and performs color printing.

FIG. 1 is a perspective view showing the schematic structure of the body of the color ink-jet recording apparatus 1 according to an example of the present invention. The color ink-jet recording apparatus 1 includes an ink detection sensor 19 of reflection type disposed such that a surface to be irradiated of the ink cartridge 2 (that is, the surface to be irradiated of the ink cartridge 2) is irradiated non-vertically (an inclination of approximately 10 degrees) with light, in order to reduce a noise signal (unnecessary reflected light) from an inclined portion 51*a*. Then, the amount of reflected light detected by the ink detection sensor 19 is compared with a first threshold value and a second threshold value, thereby judging whether ink is presence or absence and whether the ink cartridge is installed or not. Further, the detection position of the ink cartridge 2 is corrected such that the amount of reflected light may be accurately detected.

The color ink-jet recording apparatus 1 includes the ink cartridges 2, each containing a respective color ink of four color inks such as cyan, magenta, yellow and black inks in the ink storage chamber, a head unit 4 that has a printing head 3 for performing printing on a recoding medium P such as a recording paper, a carriage 5 on which the ink cartridges 2 and the head unit 4 are mounted, a driving unit 6 that linearly reciprocates the carriage 5, a platen roller 7 that extends in the reciprocation direction of the carriage 5 and is disposed to face the printing head 3, a purge device 8, and the ink detection sensor 19.

Three partition plates 4*c* (see FIG. 2) are provided upright on a placing portion 4*a* of the head unit 4. The placing portion 4*a* is divided into mounting portions of the four ink cartridges 2 by the partition plates 4*c* between a pair of side covers 4*b* formed on both sides of the placing portion 4*a*. The four ink cartridges 2, each of which contains a respective color of ink, such as cyan, magenta, yellow and black inks, in the ink storage chamber are mounted on the mounting portions.

The driving unit 6 includes a carriage shaft 9, a guide plate 10, two pulleys 11 and 12, and an endless belt 13. The carriage shaft 9 is disposed at a lower end of the carriage 5 and extends in parallel with the platen roller 7. The guide plate 10 is disposed at an upper end of the carriage 5 and extends in parallel with the carriage shaft 9. The pulleys 11 and 12 are disposed at both ends of the carriage shaft 9 and between the carriage shaft 9 and the guide plate 10. The endless belt 13 is stretched between the pulleys 11 and 12.

When a carriage motor 101 is driven, one pulley 11 rotates in normal and reverse directions. Then, the carriage 5 connected to the endless belt 13 reciprocates linearly along the carriage shaft 9 and the guide plate 10 according to the normal and reverse rotation of the pulley 11.

The recording medium P is fed from a paper cassette (not shown) provided lateral to or below the color ink-jet recording apparatus 1 and then introduced between the printing head 3 and the platen roller 7 to perform predetermined printing by ink droplets ejected from the printing head 3. Then, the recording medium P is discharged to the outside. Moreover, a paper feed mechanism and a paper discharge mechanism for the recording medium P are omitted from FIG. 1.

The purge device 8 is provided lateral to the platen roller 7. The purge device 8 is disposed to face the printing head 3 when the head unit 4 is located at a reset position. The purge device 8 includes a purge cap 14, a pump 15, a cam 16, and an ink storage portion 17. The purge cap 14 comes into contact with opening surfaces to cover a plurality of nozzles (not shown) of the printing head 3. When the head unit 4 is located at the reset position, the nozzles of the printing head 3 are covered with the purge cap 14 to suction defective ink including air bubbles trapped in the printing head 3 by means of the pump 15 driven by the cam 16, thereby purging the printing head 3. The suctioned ink is stored in the ink storage portion 17.

A wiper member 20 is disposed adjacent to the purge device 8 at a position of the purge device 8 near the platen roller 7. The wiper member 20 has a spatula shape and wipes the nozzle surface of the printing head 3 as the carriage 5 is driven. To prevent ink from drying, a cap 18 is provided to cover the plurality of nozzles of the printing head 3 that returns to the reset position after printing.

The ink detection sensor 19 is a reflective ink detection sensor that detects presence/absence of the ink cartridge 2 or presence/absence of ink in the ink cartridge 2. The ink detection sensor 19 is provided in the vicinity of an end of the driving unit 6 (a left side of FIG. 1). The ink detection sensor 19 includes an infrared light-emitting element 19*a* (see FIG. 5) and an infrared light-receiving element 19*b* (see FIG. 5). A light-irradiating surface of the infrared light-emitting element 19*a* and a light-receiving surface of the infrared light-receiving element 19*b* are inclined at the same angle as the inclined portion 51*a* (see FIG. 4) of the ink cartridge 2 inclined at approximately 20 degrees. Further, the light-irradiating surface of the infrared light-emitting element 19*a* and the light-receiving surface of the infrared light-receiving element 19*b* are disposed obliquely at approximately 10 degrees in a horizontal direction with respect to the inclined portion of the ink cartridge 2 (see FIG. 5). Light emitted from the infrared light-emitting element 19*a* onto the ink cartridge 2 is received by the infrared light-receiving element 19*b* as reflected light. According to the amount of reflected light received by the infrared light-receiving element 19*b*, presence/absence of the ink cartridge 2 or presence/absence of ink in the ink cartridge 2 is detected.

Figure 2:
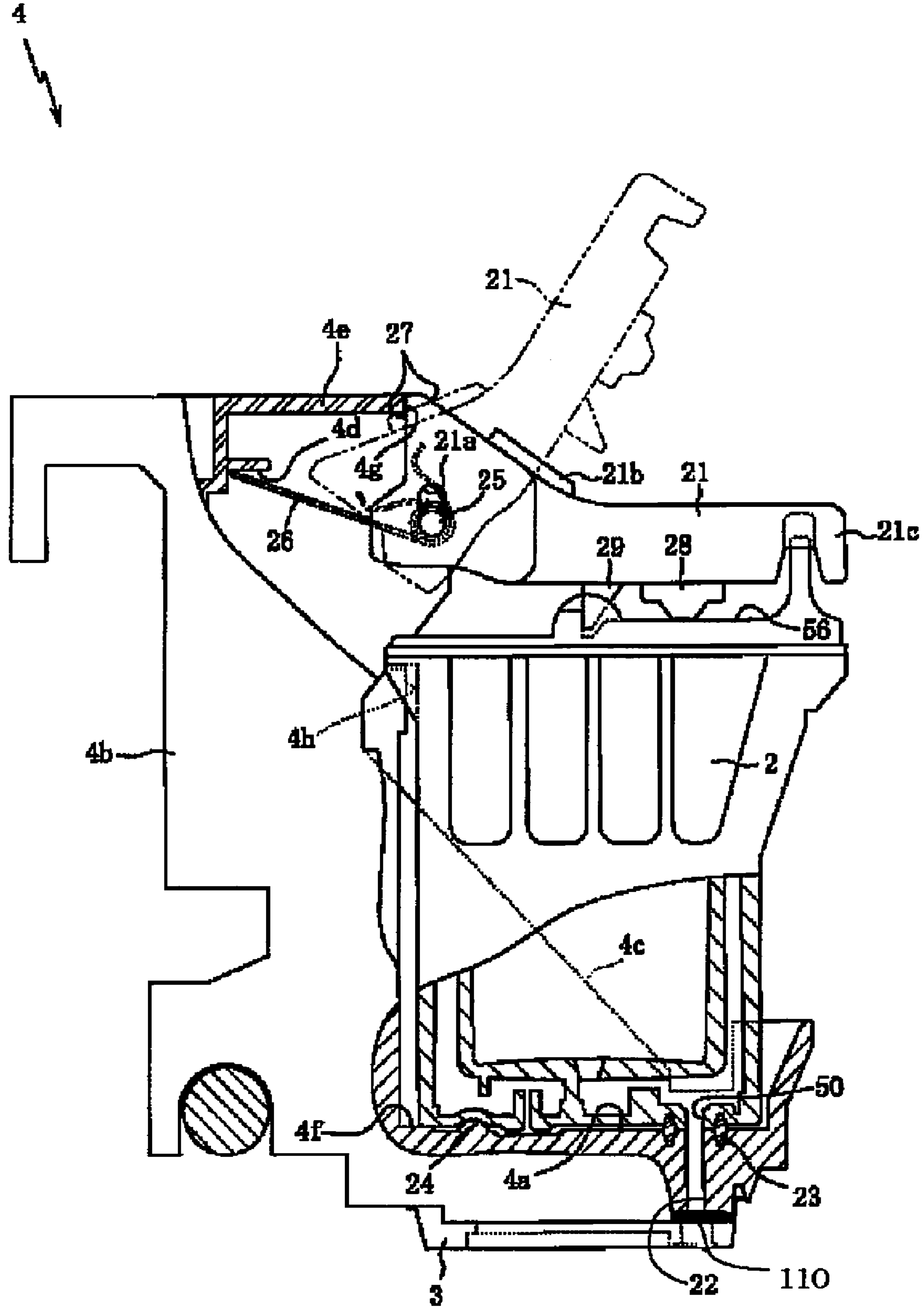
FIG. 2 is a side view showing a state where an ink cartridge is mounted on a head unit.

Next, a fixing structure of each ink cartridge 2 that is mounted on the head unit 4 will be described with reference to FIG. 2. FIG. 2 is a side view showing a state where the ink cartridge 2 is mounted on the head unit 4. In FIG. 2, the head unit 4 and the ink cartridge 2 are partially shown in cross-sectional view. Moreover, in FIG. 2, a two-dot-chain line represents a state where a fixing arm 21 is flipped up.

As described above, the head unit 4 is a member on which the ink cartridge 2 is mounted and which supplies ink to the printing head 3. The head unit 4 primarily includes a placing portion 4*a* and a fixing arm 21. The placing portion 4*a* is a portion where the ink cartridge 2 is placed and substantially has a flat surface. The placing portion 4*a* is divided into four spaces by three partition plates 4*c*, and the ink cartridges 2 are respectively mounted between the partition plates 4*c*.

An ink supply path 22 that communicates with the printing head 3 is formed to pass through the placing portion 4*a*. An end of the ink supply path 22 near the ink cartridge 2 is sealed by an O ring 23 and communicates with an ink supply port 50 of the ink cartridge 2. Meanwhile, an electroformed filter 110 is disposed in a portion of the printing head 3 that comes into contact with the ink supply port 22, thereby preventing environmental dust from entering the printing head 3. With the communication, ink is supplied from the ink cartridge 2 to the printing head 3. Further, an engagement convex portion 24 is provided lateral to the ink supply path 22 (a left side of FIG. 2) to protrude from the placing portion 4*a*. The engagement convex portion 24 is a member that positions the ink cartridge 2 and will be described below.

Moreover, a protrusion 4*f* is formed at the back of the engagement convex portion 24 in the head unit 4 (a left side of FIG. 2) to regulate movement of the ink cartridge 2 in an up and down direction (an up and down direction of FIG. 2).

The fixing arm 21 is a member that presses the ink cartridge 2 in a down direction of FIG. 2 and fixes. The fixing arm 21 is pivotally supported above the head unit 4 (an upper side of FIG. 2). One end of the fixing arm 21 (a left side of FIG. 2) is pivotally supported by a pivot shaft 25. An auxiliary spring member 26 is wound around the periphery of the pivot shaft

25. One end of the auxiliary spring member 26 is anchored to a spring anchoring portion 4*d* of the head unit 4, and the other end thereof is fixed to the fixing arm 21 in a state that an urging force is applied to the fixing arm 21. For this reason, the fixing arm 21 is kept to be flipped up (an upper side of FIG. 2) by the urging force of the auxiliary spring member 26 (a two-dot-chain line in the drawing). Accordingly, the mounting portion of the ink cartridge 2 in the head unit 4 may be opened wide, and workability of an operator may be improved upon attachment and detachment of the ink cartridge 2.

A stopper portion 27 is provided at an end of the fixing arm 21 (a left side of FIG. 2) to protrude in a triangular shape in side view. The stopper portion 27 is a portion that maintains the fixing arm 21 to be fixed to the ink cartridge 2. A long hole 21*a* through which the pivot shaft 25 is guided is formed on the fixing arm 21. The length of the long hole 21*a* is set to such a degree that the stopper portion 27 is away from an upper cover 4*e*. If a protrusion 21*b* formed in the fixing arm 21 is pushed, the fixing arm 21 moves in the down direction of FIG. 2 through the long hole 21*a*, and the upper cover 4*e* and the stopper portion 27 are disengaged from each other and opened. Further, in fixing the ink cartridge 2, if a front end 21*c* of the fixing arm 21 in a state indicated by the two-dot-chain line in FIG. 2 is pushed, the fixing arm 21 starts to rotate downward around the pivot shaft 25. After a pressing portion 28 (described below) and a top wall 56 come into contact with each other, the fixing arm 21 rotates around the contact against the auxiliary spring member 26. If the stopper portion 27 moves from a position below the upper cover 4*e* to the right side farther than an end 4*g* of the upper cover 4*e*, because the fixing arm 21 is rotating around the contact of the pressing portion 28 and the top wall 56, the stopper portion 27 is moved in an up direction of FIG. 2 by the long hole 21*a* formed in the fixing arm 21 with respect to the pivot shaft 25 and anchored to the end 4*g* of the upper cover 4*e*. Accordingly, the ink cartridge 2 may be maintained to be pressed by the pressing portion 28 and an anchoring claw 29 (described below).

A pressing portion 28 is provided on a lower surface side of the fixing arm 21 (the lower side of FIG. 2). The pressing portion 28 is a member that presses the ink cartridge 2 downward (the lower side of FIG. 2). A compressed spring (not shown) is provided in the pressing portion 28 in an elastically compressed state. The pressing portion 28 is formed to advance and retreat and usually held in an advanced state by the compressed spring. As described above, if the fixing arm 21 pivots to the ink cartridge 2, the pressing portion 28 comes into contact with the upper wall 56 of the ink cartridge 2 and retreats. Accordingly, when the urging force is applied to the ink cartridge 2 by the stopper portion 27 for fixing and the compressed spring, the pressing portion 28 may press the ink cartridge 2 downward (the lower side of FIG. 2).

Further, an anchoring claw 29 is located lateral to the pressing portion 28 (the left side of FIG. 2) to be fixed to the lower surface side of the fixing arm 21. The anchoring claw 29 is a member that positions the ink cartridge 2. As shown in FIG. 2, the anchoring claw 29 comes into contact with a wall where a second engagement concave portion 57 (described below) is provided, but a gap is formed between the bottom portion of the second engagement concave portion 57 and the anchoring claw 29. The details of positioning will be described below.

Figure 3A:
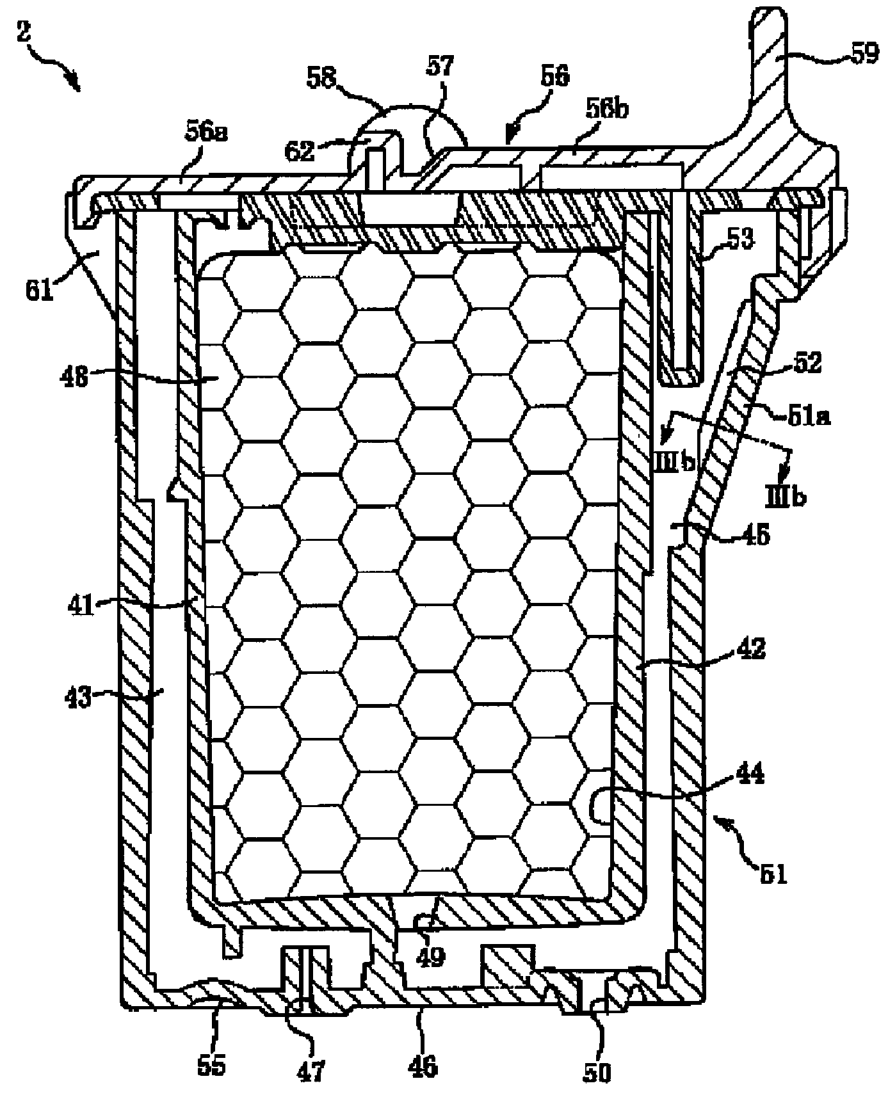
FIG. 3A is a side cross-sectional view of an ink cartridge.
Figure 3B:
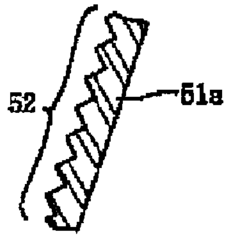
FIG. 3B is a partial cross-sectional view taken along the line IIIb-IIIb in FIG. 3A.
Figure 3C:
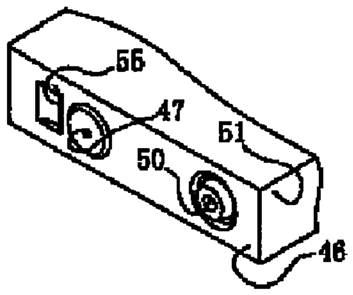
FIG. 3C is a perspective view of a bottom portion of the ink cartridge.

Next, the internal structure of the ink cartridge 2 will be described with reference to FIGS. 3A to 3C. FIG. 3A is a side cross-sectional view of the ink cartridge 2. FIG. 3B is a partial cross-sectional view taken along the line IIIbB-IIIb in FIG. 3A. FIG. 3C is a perspective view of a bottom portion of the ink cartridge 2. Moreover, FIG. 3A shows a state where ink is not stored in the ink cartridge 2.

As shown in FIG. 3A, the ink cartridge 2 is formed in a hollow box shape. The inside of the ink cartridge 2 is divided into an air introduction chamber 43, a main ink storage chamber 44, and a sub ink storage chamber 45 by partition walls 41 and 42. The air introduction chamber 43 is a space for introducing air into the main ink storage chamber 44 and communicates with the atmospheric air through an air communicating port 47 that is formed to pass through a bottom wall 46 of the ink cartridge 2. Meanwhile, an upper portion of the air introduction chamber 43 (an upper side of FIG. 3A) communicates with the main ink storage chamber 44. With the communication, air is introduced into the main ink storage chamber 44.

The main ink storage chamber 44 is a substantially closed space for storing ink. A foam (porous body) 48 that is impregnated with ink is accommodated in the main ink storage chamber 44. An ink communicating port 49 is formed in a lower portion of the main ink storage chamber 44 (a lower side of FIG. 3A) to pass through the partition wall 42. The main ink storage chamber 44 communicates with the sub ink storage chamber 45 (described below) through the ink communicating port 49. Further, the foam 48 is formed of sponge or a textile material in which ink may be held using a capillary phenomenon and is accommodated in the main ink storage chamber 44 in a compressed state. Accordingly, for example, even when the ink cartridge 2 falls down, it is possible to prevent ink from leaking from the main ink storage chamber 44 to the air introduction chamber 43 and then to prevent ink from leaking from the air introduction chamber 47 outside the ink cartridge 2.

The sub ink storage chamber 45 is a portion for storing ink and which is irradiated from the ink detection sensor 19 with infrared light (see FIG. 4). The sub ink storage chamber 45 is formed as a substantially closed space at a side end of the ink cartridge 2. The sub ink storage chamber 45 communicates with the main ink storage chamber 44 through the above-described ink communicating port 49. Ink stored in the main ink storage chamber 44 and the sub ink storage chamber 45 is supplied to the printing head 3 (see FIG. 2) through the ink supply port 50 that is substantially formed to pass through the bottom wall 46 of the ink cartridge 2.

The inclined portion 51*a* is formed at a side wall 51 of the sub ink storage chamber 45 to be inclined downward to the main ink storage chamber 44. A prism 52 is formed at an inner surface of the inclined portion 51*a* (on a side of the main ink storage chamber 44 and the left side of FIG. 3A).

The prism 52 is a member that is used to detect presence/absence of ink to be stored in the ink cartridge 2. The prism 52 is formed integrally with the inclined portion 51*a* of the side wall 51 that is molded using a transparent and transmissive material. Moreover, examples of the transmissive material include, but are not limited to, acryl resin, polypropylene, polycarbonate, polystyrene, polyethylene, polyamide, methacryl, methylpentene polymer, and glass. Further, the term 'transparent' includes not only "completely optically transparent" but also "translucent".

As shown in FIG. 3B, the prism 52 includes a plurality of reflecting surfaces that are formed by alternately arranging peaks and troughs. The plurality of reflecting surfaces are inclined downward from one end of the inclined portion 51*a* in a longitudinal direction (the upper side of FIG. 3A) to the other end thereof (the lower side of FIG. 3A) and arranged in a thickness direction of the ink cartridge 2 (a direction perpendicular to the paper in FIG. 3A). For this reason, because ink may flow down on the prism 52, desired reflected light may be prevented from being not obtained from the prism 52 when ink remains on the prism 52.

Figure 5:
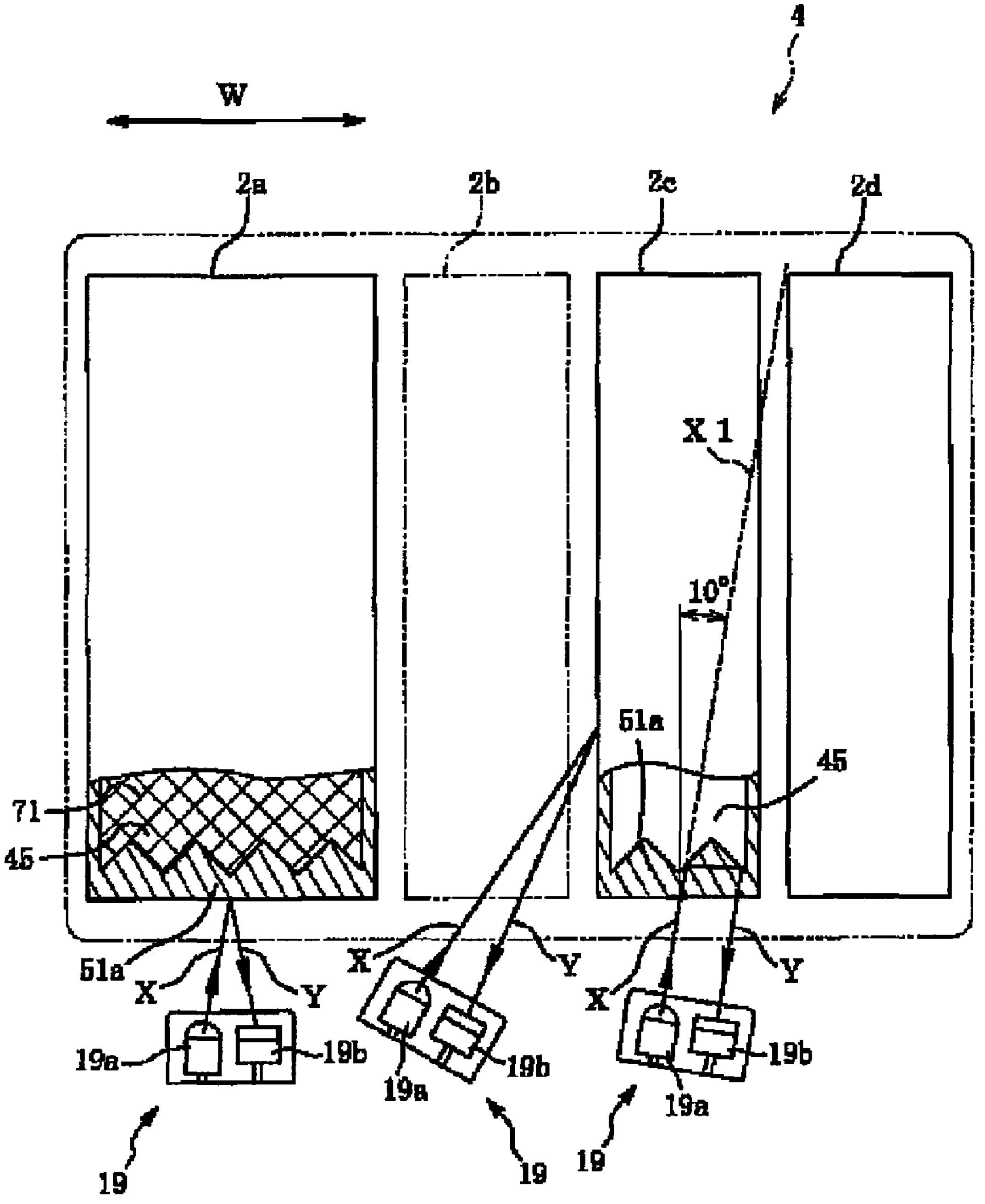
FIG. 5 is a top view of an ink cartridge and an ink detection sensor.

As such, when the prism 52 is provided at the inner surface of the inclined portion 51*a* (an ink interface side and the left side of FIG. 3B), infrared light may be emitted from the ink detection sensor 19 non-vertically (in this embodiment, at an inclination of approximately 10 degrees) from a direction facing the inclined portion 51*a* (see the right side sensor 19 in FIG. 5). As a result, reflected light that is reflected from an outer surface of the inclined surface 51*a* not having relation to the detection of presence/absence of ink from being detected by the infrared light-receiving element 19*b*. Then, reflected light from the prism 52 required for the detection of presence/absence of ink is mainly received, thereby improving accuracy of the detection of presence/absence of ink.

Infrared light that is emitted from the infrared light-emitting element 19*a* of the ink detection sensor 19 toward the inclined portion 51*a* generally has a predetermined beam angle (approximately ±10 degrees). For this reason, a light flux of infrared light spreads, and thus the amount of irradiating light per unit area of the inclined portion 51*a* is reduced. Accordingly, if the prism 52 having a plurality of reflecting surfaces is provided over the almost entire region of the inclined portion 51*a*, infrared light to be emitted may be efficiently reflected, and the infrared light-receiving element 19*b* of the ink detection sensor 19 may receive a sufficient amount of reflected light. Moreover, according to this embodiment, as shown in FIG. 3B, in the prism 52, an intersection angle of ridge lines at which the reflecting surfaces cross each other is set to about 90 degrees and 16 reflecting surfaces are formed.

A reflecting member 53 is formed in an upper portion of the sub ink storage chamber 45 to face the above-described prism 52 at a predetermined gap. The reflecting member 53 is a member that changes an optical path of infrared light passing through the sub ink storage chamber 45. The reflecting member 53 is formed in a pouch shape having an air layer therein and has a predetermined angle with respect to the prism 52.

Figure 4A:
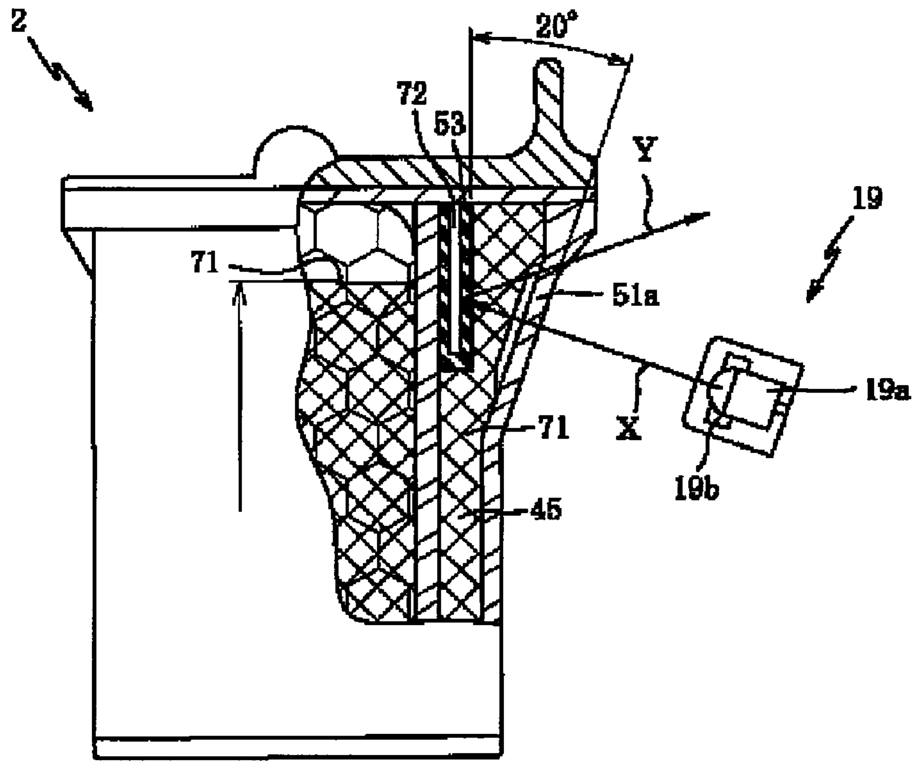
FIG. 4A is a side view of an ink cartridge.

According to the ink cartridge 2 having the above-described structure, if ink is consumed by the printing head 3, air is introduced from the air introduction chamber 43 into the main ink storage chamber 44 according to the amount of consumed ink, and the liquid level of ink in the main ink storage chamber 44 is lowered (see FIG. 4A). Further, when ink is consumed and ink in the main ink storage chamber 44 is exhausted, ink in the sub ink storage chamber 45 is supplied to the printing head 3. At this time, the inside of the sub ink storage chamber 45 is decompressed. Then, if air passing through the main ink storage chamber 44 from the air introduction chamber 43 is introduced into the sub ink storage chamber 45 through the ink communicating port 49, the decompression in the sub ink storage chamber 45 is relieved, and the liquid level of ink is lowered (see FIG. 4B).

Accordingly, in the ink cartridge 2, ink in the main ink storage chamber 44 is first consumed, and then ink in the sub ink storage chamber 45 is consumed after ink in the main ink storage chamber 44 is exhausted. Therefore, if presence/absence of ink in the sub ink storage chamber 45 is detected by the ink detection sensor 19, presence/absence of ink in the entire ink cartridge 2 may be detected.

A first engagement concave portion 55 is provided at the bottom wall 46 of the ink cartridge 2. The first engagement concave portion 55 is engaged with the engagement convex portion 24 (see FIG. 2) protruding from the placing portion 4*a* of the head unit 4 so as to position the ink cartridge 2. The first engagement concave portion 55 is provided at an end on an opposite side (the left side of FIG. 3A) to the ink supply port 50 of the bottom wall 46. Further, as shown in FIG. 3C, the first engagement concave portion 55 is substantially provided at the center in the thickness direction of the ink cartridge 2 (the direction perpendicular to the paper in FIG. 3A). Here, ring-shaped grooves are formed on the outer peripheries of the ink supply port 50 of the ink cartridge 2 and the ink supply path 22 of the head unit 4. The ink supply port 50 of the ink cartridge 2 and the ink supply path 22 of the head unit 4 are connected to each other through the O ring 23 that is provided in the ring-shaped grooves (see FIG. 2). Only with this connection, the ink cartridge 2 rotates around the ink supply port 50 (O ring 23) by inertia when the carriage 5 moves, which makes it impossible to accurately perform positioning. Accordingly, as described above, if the first engagement concave portion 55 that may be engaged with the engagement convex portion 24 of the head unit 4 is provided at the bottom wall 46 (see FIG. 3C), the ink cartridge 2 may be prevented from rotating, and thus the ink cartridge 2 may be positioned. As a result, the ink cartridge 2 may be accurately fixed to the head unit 4.

Meanwhile, the second engagement concave portion 57 is provided at the top wall 56 of the ink cartridge 2. The second engagement concave portion 57 is a portion that is engaged with the anchoring claw 29 (see FIG. 2) formed in the fixing arm 21 of the head unit 4 when the ink cartridge 2 is fixed to the head unit 4. The second engagement concave portion 57 prevents the ink cartridge 2 from being transversely shifted in a widthwise direction (a left and right direction of FIG. 3A) and prevents the ink cartridge 2 from lifting. The second engagement concave portion 57 is provided at a position corresponding to the approximately center in the widthwise direction of the ink cartridge 2 (the left and right direction of FIG. 3A), that is, the approximately center between the ink supply port 50 and the first engagement concave portion 55 formed at the bottom wall 46 in the widthwise direction of the ink cartridge 2. For this reason, the ink cartridge 2 is supported with good balance at three points of the second engagement concave portion 57, the ink supply port 50, and the first engagement concave portion 55. Accordingly, the ink cartridge 2 may be prevented from lifting or being lifting in an inclined state. Therefore, the ink cartridge 2 may be solidly fixed to the head unit 4 in a stable state.

A pair of side wall plates 58 and 58 that face each other at a predetermined gap are provided on both sides of the second engagement concave portion 57 (front and rear sides of the paper in FIG. 3A). The side wall plates 58 and 58 prevent the ink cartridge 2 from being transversely shifted, and opposing surfaces face each other in the thickness direction of the ink cartridge 2 (the direction perpendicular to the paper in FIG. 3A). The gap between the opposing surfaces is substantially the same as the width of the anchoring claw 29 (see FIG. 2) of the fixing arm 21 that is engaged with the second engagement concave portion 57. Accordingly, if the anchoring claw 29 of the fixing arm 21 is engaged with the second engagement concave portion 57, with the side wall plates 58 and 58, the ink cartridge 2 is prevented from moving (being transversely shifted) in the thickness direction (the direction perpendicular to the paper of FIG. 3A).

Here, as described above, although the head unit 4 performs printing while reciprocating in the thickness direction of the ink cartridge 2 (the direction perpendicular to the paper of FIG. 3A) (see FIG. 1), the head unit 4 in printing reciprocates while repeating rapid acceleration and deceleration in order to improve a printing speed. For this reason, when the ink cartridge 2 is transversely shifted in the movement direction of the head unit 4, a vibration occurs in the head unit 4 due to the transverse shift, which adversely affects print quality. However, with the above-described side wall plates 58 and 58, the ink cartridge 2 is prevented from being transversely shifted (saccade) in the movement direction of the head unit 4. Accordingly, the head unit 4 may smoothly reciprocate without vibrating. As a result, good print quality may be obtained.

Moreover, a pair of ribs 61 and 61 are provided lateral to the ink cartridge 2 (the left side of FIG. 2). The ribs 61 and 61 are formed to face each other at a predetermined gap, similarly to the above-described side wall plates 58 and 58. Meanwhile, in the head unit 4, an anchoring convex portion 4*h* (see FIG. 2) is provided at a position corresponding to the ribs 61 and 61. When the ink cartridge 2 is mounted on the head unit 4, the anchoring convex portion 4*h* is engaged between opposing surfaces of the ribs 61 and 61 (see FIG. 2). For this reason, with the pair of ribs 61 and 61, upon printing, the ink cartridge 2 is prevented from being transversely shifted (saccade).

The top wall 56 includes a first top wall 56*a* that is disposed on one side (the left side of FIG. 3A) of the second engagement concave portion 57 and a second top wall 56*b* that is disposed on the other side (the right side of FIG. 3A). The height of the first top wall 56*a* from the bottom wall 46 is formed to be lower than the second top wall 56*b*. Meanwhile, a handle portion 59 is provided on a side of the first top wall 56*a* opposite to the second top wall 56*b*. The handle portion 59 is a portion that is held by the operator when the ink cartridge 2 is mounted on the head unit 4. The handle portion 59 is formed to protrude upward (the upper side of FIG. 3A) such that the operator may easily hold. Accordingly, upon replacement of the ink cartridge 2 and the like, when only one ink cartridge 2 is removed from the head unit 4, the operator may remove the ink cartridge 2 by holding the handle portion 59 without interfering with adjacent ink cartridges 2. In addition, when the ink cartridge 2 is mounted on the head unit 4, the operator 4 may hold the ink cartridge 2 by holding the handle portion 59 and then easily mount the ink cartridge 2 in a narrow space.

When the ink cartridge 2 is mounted on the head unit 4, the ink cartridge 2 is installed at a predetermined place of the head unit 4 from the first top wall 56*a*. Here, as described, the height of the first top wall 56*a* from the bottom wall 46 is low. For this reason, the first top wall 56*a* and the vicinity of the shaft of the fixing arm 21 that lifts upward (a side opposite to the stopper portion 27) may be prevented from interfering with each other. Therefore, the ink cartridge 2 may be easily mounted without being caught by the head unit 4 (see FIG. 2).

The reason why the entire top wall 56 is not thinned is to maintain rigidity enough to stand a pressure of the pressing portion 28.

Moreover, a first convex portion 62 is provided lateral to the first top wall 56*a* (the right side of FIG. 3A) to protrude upward (the upper side of FIG. 3A). The first convex portion 62 forms one side wall of the above-described second engagement concave portion 57. For this reason, if the anchoring claw 29 of the fixing arm 21 is engaged with the second engagement concave portion 57, with the first convex portion 62, the ink cartridge 2 is prevented from moving (being transversely shifted) in the widthwise direction (the right direction of FIG. 3A). Therefore, the ink cartridge 2 can also be prevented from lifting.

Figure 4B:
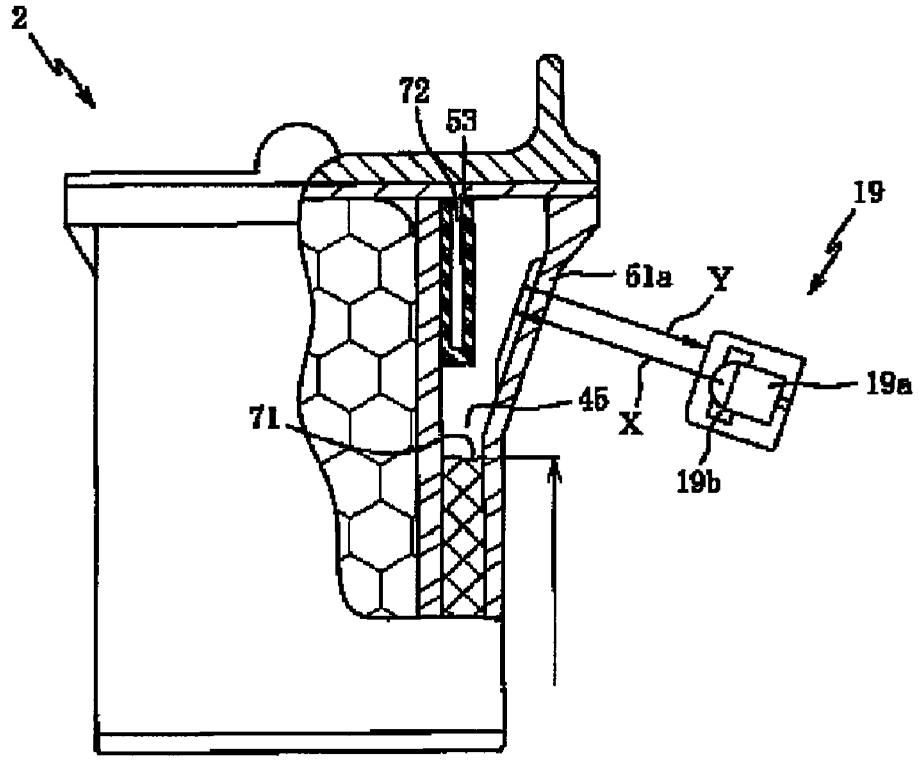
FIG. 4B is a side view of an ink detection sensor.

Next, a principle of ink presence/absence detection will be described with reference to FIGS. 4A and 4B. FIGS. 4A and 4B are side views of the ink cartridge 2 and the ink detection sensor 19. FIGS. 4A and 4B show a portion of the ink cartridge 2 in cross-sectional view. Moreover, the head unit 4, a mounting member of the ink detection sensor 19, and the like are be omitted from FIGS. 4A and 4B.

When ink 71 is filled in the ink cartridge 2, as shown in FIG. 4A, infrared light emitted from the infrared light-emitting element 19*a* of the ink detection sensor 19 (optical path X) goes forward in the ink cartridge 2 while passing through the ink 71 because the refractive index of a material of the ink cartridge 2 is close to the refractive index of the ink 71. Then, infrared light reaches the reflecting member 53 that is provided in the sub ink storage chamber 45. Infrared light that reaches the reflecting member 53 is reflected at the interface of the inner surface of the reflecting member 53 and air 72 (optical path Y) because the refractive index of a material of the reflecting member 53 is different from the refractive index of the air 72.

Here, because the inclined portion 51*a* of the ink cartridge 2 is inclined at an approximately 20 degrees with respect of the reflecting member 53, an incident angle of infrared light reaching the reflecting member 53 is different from an incident angle of infrared light on the inclined portion 51*a*. Accordingly, reflected light reflected by the reflecting member 53 (optical path Y) is reflected at an angle different from incident light. Therefore, reflected light (infrared light) does not go toward the infrared light-receiving element 19*b* of the ink detection sensor 19, and the amount of reflected light that goes toward the infrared light-receiving element 19*b* becomes small.

In contrast, when the ink 71 does not exist in the sub ink storage chamber 45 of the ink cartridge 2, as shown in FIG. 4B, infrared light irradiated from the infrared light-emitting element 19*a* of the ink detection sensor 19 (optical path X) is reflected at the interface between the inner surface of the outer wall of the sub ink storage chamber 45 and the air (optical path Y) because the refractive index of a material of the ink cartridge 2 is different from the refractive index of the air. For this reason, the amount of reflected light from the inside of the ink cartridge 2 toward the infrared light-receiving element 19*b* of the ink detection sensor 19 becomes large.

As such, the amount of reflected light that is reflected from the inside of the ink cartridge 2 (optical path Y) changes according to presence/absence of the ink. Accordingly, presence/absence of the ink in the ink cartridge 2 may be detected by detecting a difference in light amount using the infrared light-receiving element 19*b* of the ink detection sensor 19.

Further, the inclined portion 51*a* and the reflecting portion 53 are provided in the upper portion of the sub ink storage chamber 45. Accordingly, it may be judged that the ink does not exist in advance at a time the ink 71 does not exist in the upper portion of the sub ink storage chamber 45, that is, before the ink 71 does not completely exist in the ink cartridge 2.

Although the inclination of the inclined portion 51*a* is approximately 20 degrees in this embodiment, the present invention is not limited to this angle. For example, the angle may be in a range of approximately 15 to 25 degrees. That is, if the angle is 15 degrees or more, reflected light from the reflecting member 53 may be suppressed from returning to the infrared light-receiving element 19*b*. Further, if the angle is 25 degrees or less, ink may be prevented from being constantly retained in the inclined portion 51*a*.

Next, the reason why the ink detection sensor 19 is disposed to be inclined at an angle of approximately 10 degrees in the horizontal direction with respect to the inclined portion 51*a* (see FIG. 3A) of the ink cartridge 2 as a surface to be irradiated of infrared light will be described with reference to FIG. 5. FIG. 5 is a top view showing the ink cartridge 2 and the ink detection sensor 19. Moreover, the ink cartridge 2*a* to 2*d* mounted on the head unit 4 reciprocates in a direction of an arrow W.

First, when the ink detection sensor 19 is disposed vertically with respect to the inclined portion 51*a* (see the left side sensor 19 in FIG. 5), light irradiated from the infrared light-emitting element 19*a* (optical path X) passes through the inclined portion 51*a* formed from a transmissive member. However, incident light that does not pass through the inclined portion 51*a* (optical path X) may be reflected from the outer surface (a side opposite to the ink) of the inclined portion 51*a* due to fine concavo-convexes of the outer surface of the inclined portion 51*a*. Then, if reflected light (optical path Y) is received by the infrared light-receiving element 19*b*, even though the ink 71 exists in the sub ink storage chamber 45, it may be judged that the ink 71 does not exist, which adversely affect the detection accuracy of presence/absence of the ink according to the related art.

When the ink detection sensor 19 is disposed at an angle larger than approximately 10 degrees with respect to the inclined portion 51*a* (see the center sensor 19 in FIG. 5), for example, even if an ink cartridge 2*b* does not exist, light emitted from the infrared light-emitting element 19*a* (optical path X) may be reflected by an adjacent ink cartridge 2*c*. Then, if reflected light (optical path Y) is received by the infrared light-receiving element 19*b*, even though the ink cartridge 2*b* does not exist, it may be judged that the ink cartridge 2*b* exists. Accordingly, the detection of presence/absence of the ink cartridge 2*b* may not be performed.

When the ink detection sensor 19 is disposed at an approximately 10 degrees with respect to the inclined portion 51*a* (see the right side sensor 19 in FIG. 5), the infrared light-receiving element 19*b* is inclined. Accordingly, light that is reflected from the outer surface (the side opposite to the ink) of the inclined portion 51*a* (see the optical path Y for the left side sensor 19 in FIG. 5) may be suppressed from being received by the infrared light-receiving element 19*b*. Therefore, when the ink exists, as described with reference to FIG. 4, light that passes through the inclined portion 51*a* is not received. Meanwhile, when the ink does not exist, reflected light from the interface between the inner side (the sub ink storage chamber 45 side) of the inclined portion 51*a* and the air (optical path Y) is received by the infrared light-receiving element 19*b*. Accordingly, presence/absence of the ink may be accurately judged on the basis of the difference in light amount. Further, when the ink cartridge 2*c* does not exist, light that is emitted from the infrared light-emitting element 19*a* is not irradiated onto an adjacent ink cartridge 2*d* (see an optical path X). Therefore, presence/absence of the ink cartridge 2*c* can be accurately judged.

Although the inclination is set to approximately 10 degrees in this embodiment, the inclination is not limited to this angle. Because the angle is determined by various factors, such as the size of the ink cartridge 2, a gap between the ink cartridges 2, a gap between the ink cartridge 2 and the ink detection sensor 19, and the like, an appropriate inclination may be set.

The present invention is not limited to the ink cartridge and the ink-jet recording apparatus of the above-described embodiment. Various examples may be taken insofar as an ink cartridge is provided, in which the resin material forming the ink storage chamber contains the crystal-nucleating agent and the conductivity of the ink for ink-jet recording in a range of about 3 mS/cm to about 10 mS/cm.

EXAMPLES

Hereinafter, Examples and Comparative Examples of the present invention will be described in detail. Moreover, in the following Examples and Comparative Examples, as the resin material forming the ink storage chamber of the ink cartridge, polypropylene containing 1200 ppm of bis(p-methylbenzylidene)sorbitol as the crystal-nucleating agent was used (hereinafter, for convenience, the resin material is referred to as PPS12). The PPS12 is excellent in transparency and moldability (anti-void property). However, if it is in contact with the known ink having conductivity of less than 3.0 for a long time, the crystal-nucleating agent in polypropylene is precipitated in the ink. Further, the adjustment of the conductivity of the ink for ink-jet recording was performed using a coloring agent or sodium sulfate.

Examples 1 to 5 and Comparative Examples 1 to 6

The ink components shown in Table 1 were mixed and stirred sufficiently, and filtered using a 0.2 μm membrane filter, thereby preparing ink for ink-jet recording of Examples 1 to 5 and Comparative Examples 1 to 6. In respect to the obtained ink, the conductivity of the ink (ink conductivity) was measured using a pH meter (F-54 manufactured by Horiba, Ltd.), to which a dip-type conductivity cell (9382-10D manufactured by Horiba, Ltd.) is connected as an electrode. Further, a long-term preservation evaluation, a precipitation amount evaluation, and a durability evaluation were performed as described below. The obtained results are shown in Table 1.

<Long-Term Preservation Evaluation>

The ink was filled in a closed glass vessel, and was preserved in a constant temperature bath at 60° C. for 14 days. Next, after the vessel was left at room temperature for 7 days, it was observed through a microscope whether or not the precipitate occurs in the closed vessel. As a reference, ink that had not been preserved in the constant temperature bath at 60° C. was used. The evaluation criteria are as follows. Moreover, in respect to the ink (Comparative Example 6) showing the long-term preservation evaluation result of "Not Good", the precipitation amount evaluation or the durability evaluation were not performed. Here, in the long-term preservation evaluation of Comparative Example 6, the precipitate resulting from the dye was observed.

"Good": Precipitate does not increase, comparing to the reference.

"Not Good": Precipitate increases, comparing to the reference.

<Precipitation Amount Evaluation>

The PPS12 of the crystal-nucleating agent containing polyproplylene as the resin material forming the ink storage chamber of the ink cartridge was processed to have a surface area of 95 $cm^2$ and immersed in 50 mL ink in the closed vessel, and the closed vessel was preserved in the constant temperature bath at 60° C. for 14 days. Next, the vessel was left at room temperature for 7 days and a resin piece was extracted from the closed vessel. Subsequently, the evaluation was performed through comparison a filtering time (t1) of 20 mL ink in the closed vessel with a blank (t2) {Precipitation Amount (%)=(t1/t2)×100}. A filter that had been used for filtering was an electroformed filter having an effective filtration area of 7.6 $cm^2$, the number of pores of 16500, and a pore size of 13 μm. Here, the term 'blank' means a filtering time when ink preserved at 60° C. for 14 days and then left at room temperature for 7 days is filtered in a state where the resin material piece is not immersed. The evaluation criteria are as follows. Moreover, it can be experientially seen that this evaluation method has high correlation with an actual evaluation. If the precipitation amount exceeds +350%, ink supply is lacking in the ink flow passage, and there is a high possibility that ink is not ejected.

"Excellent": +200% or less
"Good": More than +200% but +350% or less
"Not Good": More than +350%

From Table 1, it can be seen that all Examples 1 to 5 in which the conductivity of the ink is 3 mS/cm or more show the good results ("Excellent" or "Good"), while Comparative Examples 1 to 5 in which the conductivity of the ink is less than 3 mS/cm show the unpreferable results ("Not Good").

<Assembling of Ink-Jet Recording Apparatus>

The PPS12 of the crystal-nucleating agent containing polypropylene was used as the resin material used for the ink cartridge, and a shape corresponding to the reflective ink detection sensor shown in FIGS. 1 to 5 was molded, thereby manufacturing an ink cartridge. The ink of Examples 1 to 5 and Comparative Examples 1 to 6 was dividedly injected in the ink storage chamber of the ink cartridge, and the ink cartridge was mounted on the ink-jet recording apparatus shown in FIG. 1. Then, ejection stability in a long period was examined.

<Durability Evaluation>

The durability evaluation was performed in the following procedure. The obtained results are shown in Table 1.

1) The ink to be examined was dividedly injected into 40 cartridges. The injection amount is approximately 16 mL per cartridge.
2) The 40 injected cartridges were individually sealed and then left in the constant temperature of 60° C. for two weeks.
3) The cartridges that had been left at 60° C. for two weeks were left at room temperature for 7 days.
4) The cartridges that had been left at room temperature were mounted on the ink-jet recording apparatus, and a specific check pattern that corresponds to wide area printing, which easily causes lacking in ink supply, was printed. For ease of evaluation of the number of non-ejection nozzles, in the specific check pattern, wide area printing on the entire surface of an A4 paper spreads 20 times in the longitudinal direction (sub scanning direction) and is exploded into 20 A4 papers.
5) Printing of the specific check pattern was performed until all the 40 cartridges have been consumed.
6) In respect to the print samples of a final set of 20 papers, the evaluation about the number of non-ejection nozzles was performed.

If the precipitate occurs in the ink of the ink cartridge, the precipitate is accumulated on the electroformed filter that is provided before the ink is introduced into the head. The electroformed filter is the same as the filter that is used in the above-described precipitation amount evaluation method. When the precipitation amount is extremely small, it does not matter. However, the progress of accumulation is accompanied by closing of the opening of the electroformed filter, such that ink supply is lacking. In particular, it markedly appears upon printing requiring a large amount of ink, such as wide area printing. If this phenomenon occurs, ink is not ejected. This phenomenon was evaluated using the specific check pattern, and the evaluation was performed on the basis of the number of non-ejection nozzles in the final set of printed matters in the above procedure 6). Here, a nozzle that have not ejected the ink continuously during printing of the 20 papers was referred to as a fixed non-ejection nozzle, and a non-ejection nozzle, the position of which had been changed during printing of the 20 papers was referred to as a moving non-ejection nozzle.

"Good": The number of fixed non-ejection nozzles is 0 (zero) and the number of moving non-ejection nozzles is 3 or less per 20 papers "Not Good": The number of fixed non-ejection nozzles is 1 (one) or more and the number of moving non-ejection nozzles is 4 or more per 20 papers From the results of Table 1, even though the PPS12 of the crystal-nucleating agent containing polypropylene was used, in the ink-jet recording apparatus that used the ink cartridges of Examples 1 to 5, in which the ink conductivity is 3 mS/cm or more, the good result ("Good") was obtained in that ink supply was not lacking, and non-ejection die not occur was obtained. Meanwhile, in the ink-jet recording apparatus that used the ink cartridges of Comparative Examples 1 to 5, in which the ink conductivity was less than 3 mS/cm, the unpreferable result ("Not Good") was obtained in that non-ejection occurred due to lacking in ink supply in the final set of printed matters. Further, in the ink-jet recording apparatus that used the ink cartridge of Comparative Example 6, in which the ink conductivity was more than 10 mS/cm, the long-term preservation evaluation of the ink itself was unpreferable ("Not Good").

TABLE 1

| | | Example 1 | Example 2 | Example 3 | Example 4 | Example 5 | Comparative Example 1 |
|---|---|---|---|---|---|---|---|
| Ink Composition (% by weight) | C.I. Direct Blue 199 | 6.0 | — | 3.0 | — | 3.0 | 3.0 |
| | C.I. Reactive Red 17 | — | 2.4 | — | 2.4 | — | — |
| | Sodium Sulfate | — | 0.2 | 0.5 | 0.5 | 1.0 | — |
| | Glycerin | 30.0 | 30.0 | 30.0 | 30.0 | 30.0 | 30.0 |
| | Diethylene Glycol | — | 4.0 | — | 4.0 | — | — |
| | Triethylene Glycol Butyl Ether | 4.0 | 5.0 | 4.0 | 5.0 | 4.0 | 4.0 |
| | Triethanol Amine | 0.1 | 0.2 | 0.1 | 0.2 | 0.1 | 0.1 |
| | 1,2,3-benzotriazole | 0.1 | — | 0.1 | — | 0.1 | 0.1 |
| | Proxel GXL-S*[1] | 0.1 | 0.2 | 0.1 | 0.2 | 0.1 | 0.1 |
| | Water | Balance | Balance | Balance | Balance | Balance | Balance |
| Evaluation | Ink Conductivity [mS/cm] | 3.2 | 3.2 | 4.3 | 4.5 | 6.3 | 1.9 |
| | Long-Term Preservation | Good | Good | Good | Good | Good | Good |
| | Precipitation Amount | Good | Good | Excellent | Excellent | Excellent | Not Good |
| | Filtering Time (t1) [sec] | 302 | 330 | 180 | 121 | 103 | >480 |
| | Blank (t2) [sec] | 102 | 109 | 103 | 89 | 99 | 103 |
| | Precipitation Amount (t1/t2) [%] | 296 | 303 | 175 | 136 | 104 | >466 |

TABLE 1-continued

| | | | | | | | |
|---|---|---|---|---|---|---|---|
| | Durability | Good | Good | Good | Good | Good | Not Good |

| | | Comparative Example 2 | Comparative Example 3 | Comparative Example 4 | Comparative Example 5 | Comparative Example 6 |
|---|---|---|---|---|---|---|
| Ink Composition (% by weight) | C.I. Direct Blue 199 | — | 4.0 | 3.0 | 5.0 | 3.0 |
| | C.I. Reactive Red 17 | 2.4 | — | — | — | — |
| | Sodium Sulfate | — | — | 0.1 | — | 2.2 |
| | Glycerin | 30.0 | 30.0 | 30.0 | 30.0 | 30.0 |
| | Diethylene Glycol | 4.0 | — | — | — | — |
| | Triethylene Glycol Butyl Ether | 5.0 | 4.0 | 4.0 | 4.0 | 4.0 |
| | Triethanol Amine | 0.2 | 0.1 | 0.1 | 0.1 | 0.1 |
| | 1,2,3-benzotriazole | — | 0.1 | 0.1 | 0.1 | 0.1 |
| | Proxel GXL-S*[1] | 0.2 | 0.1 | 0.1 | 0.1 | 0.1 |
| | Water | Balance | Balance | Balance | Balance | Balance |
| Evaluation | Ink Conductivity [mS/cm] | 2.3 | 2.4 | 2.5 | 2.8 | 10.5 |
| | Long-Term Preservation | Good | Good | Good | Good | Not Good |
| | Precipitation Amount | Not Good | Not Good | Not Good | Not Good | — |
| | Filtering Time (t1) [sec] | >480 | >480 | 474 | 393 | — |
| | Blank (t2) [sec] | 91 | 98 | 114 | 95 | — |
| | Precipitation Amount (t1/t2) [%] | >527 | >490 | 416 | 414 | — |
| | Durability | Not Good | Not Good | Not Good | Not Good | — |

*[1]dipropylene glycol aqueous solution containing 1,2-benzisothiazolidin-3-one (20% by weight; manufactured by Arch Chemicals in Japan)

What is claimed is:

1. An ink cartridge that is mounted on an ink-jet recording apparatus, the ink cartridge comprising: an ink storage chamber for storing ink for ink-jet recording and ink stored in the ink storage container, wherein a resin material forming the ink storage chamber contains a crystal-nucleating agent, and the ink has conductivity ranging from about 3 mS/cm to about 10 mS/cm;

wherein the ink comprises an electrolyte selected from the group consisting of sodium sulfate, potassium sulfate, ammonium sulfate, sodium nitrate, potassium nitrate, and ammonium nitrate.

2. The ink cartridge according to claim 1, wherein the crystal-nucleating agent is a sorbitol compound.

3. The ink cartridge according to claim 2, wherein the sorbitol compound is selected from dibenzyldene sorbitol, bis(p-methylbenzylidene) sorbitol, and bis (p-ethylbenzylidene) sorbitol.

4. The ink cartridge according to claim 1, wherein the ink further comprises a coloring agent.

5. The ink cartridge according to claim 4, wherein the coloring agent is a dye.

6. The ink cartridge according to claim 1, wherein the electrolyte comprises sodium sulfate.

7. The ink cartridge according to claim 6, wherein the ink further comprises a coloring agent.

8. The ink cartridge according to claim 1, wherein the resin material forming the ink storage chamber is polyolefin resin.

9. An ink-jet recording apparatus comprising:

the ink cartridge according to claim 1; and an ink-jet recording head that has ejection nozzles for ejecting the ink stored in the ink cartridge.

10. The ink-jet recording apparatus according to claim 9, further comprising:

a reflective ink detection sensor that is mounted to detect an ink residual quantity of the ink stored in the ink cartridge.

11. The ink cartridge according to claim 1, wherein the ink has a conductivity ranging from 3.2 mS/cm to 6.3 mS/cm.

* * * * *